United States Patent
Cocks

[19]

[11] Patent Number: 6,029,879

[45] Date of Patent: Feb. 29, 2000

[54] ENANTIOMORPHIC FRICTION-STIR WELDING PROBE

[76] Inventor: Elijah E. Cocks, 5 Learned Pl., Durham, N.C. 27705

[21] Appl. No.: 08/936,007

[22] Filed: Sep. 23, 1997

[51] Int. Cl.$^7$ .................................................. B23K 20/12

[52] U.S. Cl. ..................... 228/2.1; 228/112.1; 228/106; 228/114; 228/114.5; 228/5.5; 228/25; 228/119

[58] Field of Search .................... 228/2.1, 112.1, 228/106, 114, 114.5, 5.5, 25, 119

[56] References Cited

U.S. PATENT DOCUMENTS

| | | | |
|---|---|---|---|
| 5,460,317 | 10/1995 | Thomas et al. | 228/112.1 |
| 5,697,544 | 12/1997 | Wykes | 228/2.1 |
| 5,718,366 | 2/1998 | Colligan | 228/112.1 |

OTHER PUBLICATIONS

C.J. Dawes and W.M. Thomas. "Friction–Stir Process Welds Aluminum Alloys." *Welding Journal*. Mar., 1996. 41–45.

*Primary Examiner*—Patrick Ryan
*Assistant Examiner*—M. Alexandra Elve

[57] ABSTRACT

A friction-stir welding probe tip is disclosed which has right-handed threads on one portion of the probe and left-handed threads on another portion of the probe such that weld material is drawn to the middle of the weld as the friction-stir welding probe is rotated and passed along the joint region of the pieces to be joined. This probe tip is also fitted with a shoulder region for gripping by a rotation means.

5 Claims, 1 Drawing Sheet

Cross-section of
probe and shoulder rod

Enlarged view
of probe

Left-handed
12/24 thread

Right-handed
12/24 thread

|0.22"|

ENANTIOMORPHIC FRICTION-STIR WELDING PROBE

FIELD OF THE INVENTION

This invention relates to friction-stir welding, and more particularly to the probe used in the friction-stir welding process.

BACKGROUND OF THE INVENTION

Welding became a developed means of joining metals during World War I and has since expanded to become one of the most widely used joining techniques. It is commonly applied in applications in which leak-tightness is important, as in containers or conduits for liquids or gases, such as ships or pipelines. Welding generally involves local melting of the materials to be welded with or without the application of pressure; cold welding is also possible using high pressure rolling or hammering. The heat needed in hot-welding is typically generated using electric current as in resistance welding, including seam welding and spot welding, or in electric arc welding. Melting can also be accomplished with a gas flame as in fusion welding with an oxyacetylene torch.

The technique of using heat generated by friction has been found to produce a combination of metal deformation and heat sufficient to allow metal to be joined without actually melting. In particular, friction-stir welding (FSW) is a process disclosed by Thomas, et al. in U.S. Pat. No. 5,460,317 entitled "FRICTION WELDING" as a means of producing low cost, solid-state welds with low-distortion and reduced cracking in the heat affected zone of the joint. FSW allows the joining of alloys that are normally difficult to weld by processes which require melting, such as aluminum alloys 2090 (Al—Cu), 6082 (Al—Mg—Si), and 7075 (Al—Zn—Cu—Mg). In the FSW process, a small probe is set into rotation and translated along the length of the joint to be welded. The frictional heat generated as a result of the contact between the probe and workpiece locally heats and plasticizes the workpiece metal. This plasticized metal deforms and flows around the moving probe and cools as the rotating probe passes to leave a welded joint. FSW offers a number of advantages over other welding techniques as described by C. J. Dawes and W. M. Thomas in the article entitled "Friction-stir Process Welds Aluminum Alloys" which was published in the March, 1996, issue of *The Welding Journal* on pages 41 to 45. These advantages include the elimination of consumables such as cover-gas or electrodes, the elimination of toxic fumes, and the fact that metal welded with the FSW process is not liquified during the welding process.

FSW does, however, require that the metals being welded be firmly clamped. Also, as currently developed, the speed of welding is slower than and the welding equipment is not as portable as that for other welding processes.

The probe which is used to produce frictional heat must, of necessity, play an important role in friction-stir welding. Thomas, et al. in U.S. Pat. No. 5,460,317 mention that the probe which enters the workpiece tapers outwardly in a direction towards the workpiece. They disclose a probe having an elongate axis which intersects the joint region and extends substantially parallel with the sides of the workpiece defining the joint region and a probe which defines an elongate axis which extends in a direction transverse to a plane parallel with the joint region. The probe they disclose has a cross-section that is substantially circular and is composed of a material harder than the workpiece. However, Thomas, et al. do not disclose any details of probe surface morphology and, in particular, do not indicate the advantages that have now been discovered to be associated with a probe surface morphology that entails an enantiomorphic relationship between the upper and the lower portions of the probe itself. The word enantiomorphic is used here to refer to objects which are in a mirror image relationship one to the other, such as a left hand and a right hand.

SUMMARY OF THE INVENTION

An enantiomorphic friction-stir welding probe of particular configuration has now been discovered which improves the strength of friction-stir welds. The present invention discloses a probe which utilizes a combined right-handed and left-handed surface morphology, such as right-handed and left-handed threads. Since a right-handed and a left-handed thread pattern combined at an interface are mirror images across that interface, the term enantiomorphic has been adopted to describe this surface morphology. It has now been discovered that when such an enantiomorphic probe rotates in a clockwise direction, the lower portion of the probe is preferably right-handed and the upper portion is preferably left-handed and that such an arrangement has been found to produce welds of improved mechanical strength. Conversely, if the probe rotates in a counter-clockwise direction, the lower portion of the probe is preferably left-handed and the upper portion is preferably right-handed. When such an enantiomorphic probe is set in rotation and translated along a joint, it has been discovered that welds of substantially increased mechanical properties are produced. While it is not known with certainty, it is believed that these improved properties result because this enantiomorphic relationship forces weldment metal towards the center-line of the weldment.

OBJECTS OF THE INVENTION

It is an object of this invention to provide an improved friction-stir welding probe capable of producing weldments of enhanced strength.

It is another object of this invention to improve the quality of friction-stir welds by the use of an enantiomorphic friction-stir welding probe.

It is yet another object of this invention to promote the use of friction-stir welding in aerospace and automotive welding applications by producing weldments having improved mechanical properties.

Figure 1A:
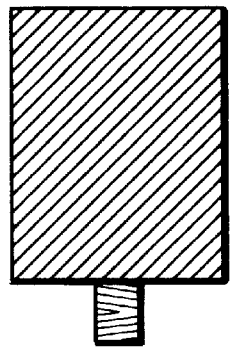
FIG. 1A is a schematic drawing showing the cross-section of an enantiomorphic probe and shoulder rod.
Figure 1B:
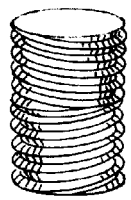
FIG. 1B is a schematic drawing showing an enlarged view of the enantiomorphic probe.

The present invention will now be described more fully hereinafter with reference to the accompanying drawings in which a preferred embodiment of the invention are shown. This invention may, however, be embodied in many different specific forms and should not be construed as limited to the specific embodiment set forth herein; rather, specific embodiments are provided so that this disclosure will be thorough and complete, and will fully convey the scope of the invention to those skilled in the art.

DESCRIPTION OF A PREFERRED EMBODIMENT

In a preferred embodiment, a tool steel rod was machined to have a shoulder portion for attachment by gripping that is ¾ of an inch in diameter and 1 inch in length. The rod was further machined at one end to form a probe that was 0.22 inches in diameter and ¼ of an inch in length, this probe being connected to the shoulder portion to render easier the attachment of the probe to a milling machine. The surface morphology of this probe region was made with an upper portion having size 12/24 left-handed machine threads and a lower portion having size 12/24 right-handed machine threads. The relationship of this surface morphology was thus an enantiomorphic one. This probe was used to friction-stir weld two plates of 6061 aluminum alloy, 7 inches in length by 3 inches in width by ¼ of an inch in thickness, which were affixed to the table of a milling machine with the 7 inch sides flush with one another. The shoulder rod of the enantiomorphic friction-stir welding probe were placed in a collet and tightened in the column of the milling machine. This enantiomorphic probe was rotated by the milling machine in a clockwise direction at a rotational speed of 2750 rpm and translated at a speed of approximately 1.5 inches per minute through the lengthwise joint formed by the flush contact of the two 6061 aluminum alloy pieces. The friction of the probe in contact with the aluminum alloy pieces generated heat to such an extent that the aluminum alloy was plasticized and flowed around the rotating probe while being drawn into the weldment center-line as a result of the enantiomorphic threads. Measurement of the temperature of the metal showed that the 6061 aluminum alloy weldment material reached temperatures of approximately 650° F. After the probe had passed, this plasticized metal cooled to form a welded joint with the weldment metal having a finer grain size than the original aluminum alloy metal.

Table 1 shows the 6061 aluminum alloy weld strength results as produced by 4 different probe designs each rotated at 2750 rpm in the clockwise direction and translated along the joint to be welded at 1.5 inches per minute. All probes were ¼ of an inch in length. The cylindrical probe had a circular cross-section that was constant along the length and measured 3/16 of an inch in diameter; the tapered probe had a circular cross-section that measured ⅛ of an inch in diameter at the bottom of the probe and ¼ of an inch in diameter at the top; the threaded probe measured 0.22 inches in diameter and had right-handed 12/24 machine threads along its entire length; the enantiomorphic head was as previously described, measuring 0.22 inches in diameter with 12/24 right-handed thread on the bottom portion of the probe and 12/24 left-handed thread on the top portion of the probe. The enantiomorphic probe produced welds having the highest strength. While it is not known with certainty, it is believed that this improvement in weld-strength is a result of an inwardly directed metal flow produced by the enantiomorphic surface morphology of the friction-stir welding probe combined with the proper rotational direction of the probe, as previously described.

TABLE 1

Weld Strength Results for 4 Different Probe Designs

| Friction-Stir Welding Probe | Weld Yield Strength (0.2% offset) (MPa) | Weld Ultimate Tensile Strength (MPa) |
| --- | --- | --- |
| Cylindrical | 56 | 65 |
| Tapered | 11 | 11 |
| Threaded | 107 | 123 |
| Enantiomorphic | 120 | 162 |

It is believed that this increase in strength is a result of a reduced size of microscopic metallurgical flaws in the weldment as a result of the centrally directed metal flow caused by the enantiomorphic surface morphology. It is known that the critical strength for fracture of a material is proportional to the fracture toughness of that material divided by the square root of the maximum flaw size. As shown in Table 1, the ratio of the ultimate tensile strength of a weld produced by the enantiomorphic probe to that of a weld produced by a smooth, cylindrical probe is approximately 2.5 to 1, and therefore could be explained at least in part by a ratio of maximum flaws sizes of 0.6 to 1, with the maximum flaw size in the weldment produced by the enantiomorphic probe being smaller by this ratio than that produced by the smooth, cylindrical probe.

I claim:

1. A friction-stir welding probe for producing a friction-stir weld, said friction-stir welding probe having an upper probe portion and a lower probe portion, said upper portion being connected to a shoulder for attachment to a means for producing rotation, said upper portion and said lower portion connecting to each other at an interface, said upper portion having a left-handed helical surface morphology and said lower portion having a right-handed helical surface morphology, said rotation being in a clockwise direction, whereby said friction-stir welding probe produces friction-stir welds of improved strength.

2. A friction-stir welding probe as disclosed in claim 1 wherein said left-handed surface and said right handed helical surface morphology is made with threads.

3. A friction-stir welding probe for producing a friction-stir weld, said friction-stir welding probe having an upper probe portion and a lower probe portion, said upper portion being connected to a shoulder for attachment to a means for producing rotation, said upper portion and said lower portion connecting to each other at an interface, said upper portion having a right-handed helical surface morphology and said lower portion having a left-handed helical surface morphology, said rotation being in a counter-clockwise direction, whereby said friction-stir welding produces friction-stir welds of improved strength.

4. A friction-stir welding probe as disclosed in claim 3 wherein said left-handed and said right-handed helical surface morphology is made with threads.

5. A friction-stir welding probe for producing a friction-stir weld, said friction-stir welding probe having an upper probe portion and a lower probe portion, said upper portion being connected to a shoulder for attachment to a means for producing rotation, said upper portion and said lower portion connecting to each other at an interface, said upper and lower probe portions each having a helical surface pattern, said helical surface pattern of said upper portion being enantiomorphic with respect to said helical surface morphology of said lower portion, whereby said friction-stir welding probe produces friction-stir welds of improved strength.

* * * * *